(12) United States Patent
Lam et al.

(10) Patent No.: US 12,507,953 B2
(45) Date of Patent: Dec. 30, 2025

(54) FINGER-WORN SENSING DEVICE

(71) Applicant: Quanta Computer Inc., Taoyuan (TW)

(72) Inventors: Barry Lam, Taoyuan (TW);
Chia-Yuan Chang, Taoyuan (TW);
Jung-Wen Chang, Taoyuan (TW);
Kao-Yu Hsu, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 752 days.

(21) Appl. No.: 17/851,224

(22) Filed: Jun. 28, 2022

(65) Prior Publication Data
US 2023/0329639 A1 Oct. 19, 2023

(30) Foreign Application Priority Data
Apr. 18, 2022 (TW) .................................. 111203921

(51) Int. Cl.
*A61B 5/00* (2006.01)

(52) U.S. Cl.
CPC .......... *A61B 5/6826* (2013.01); *A61B 5/0059* (2013.01); *A61B 5/6831* (2013.01); *A61B 5/742* (2013.01); *A61B 5/7455* (2013.01); *A61B 2562/227* (2013.01)

(58) Field of Classification Search
CPC ... A61B 5/6826; A61B 5/0059; A61B 5/6831; A61B 5/742; A61B 5/7455; A61B 2562/227; A61B 5/14552
See application file for complete search history.

(56) References Cited

U.S. PATENT DOCUMENTS

| | | | |
|---|---|---|---|
| 2010/0168531 A1* | 7/2010 | Shaltis | A61B 5/6826 600/301 |
| 2010/0298677 A1* | 11/2010 | Lu | A61B 5/6838 600/324 |
| 2015/0164422 A1* | 6/2015 | Lee | A61B 5/6831 600/300 |
| 2015/0190072 A1* | 7/2015 | Armstrong | A61B 5/1118 600/300 |
| 2015/0201875 A1* | 7/2015 | Tateda | A61B 5/6826 600/324 |
| 2016/0066827 A1* | 3/2016 | Workman | A61B 5/742 600/340 |
| 2016/0213267 A1* | 7/2016 | Laakkonen | A61B 5/6826 |
| 2019/0008396 A1* | 1/2019 | Baron | A61B 5/14552 |

(Continued)

*Primary Examiner* — Abid A Mustansir
(74) *Attorney, Agent, or Firm* — McClure, Qualey & Rodack, LLP

(57) ABSTRACT

A finger-worn sensing device includes a measurement-device body and a finger-worn structure. The finger-worn structure includes a carrying base on which the measurement-device body can be detachably mounted. The finger-worn structure also includes a first elastic band and a second elastic band, which extend from opposite sides of the carrying base and which overlap each other under the carrying base to form an annular space for the user's finger. The first elastic band has a first free end. The second elastic band has a second free end. The first free end is closer to the annular space than the second free end. A light emitter and a light receiver are located on the inner walls of the first and second elastic bands, respectively. The light emitter and the light receiver are arranged opposite each other so that they can optically sense physiological readings from the finger.

10 Claims, 8 Drawing Sheets

(56) References Cited

U.S. PATENT DOCUMENTS

2020/0085360 A1\*   3/2020   Yuan .................. A61B 5/14552
2020/0397101 A1\*  12/2020   Yuan .................... A61B 5/6826
2021/0037932 A1\*   2/2021   Min ..................... A61B 5/0006

\* cited by examiner

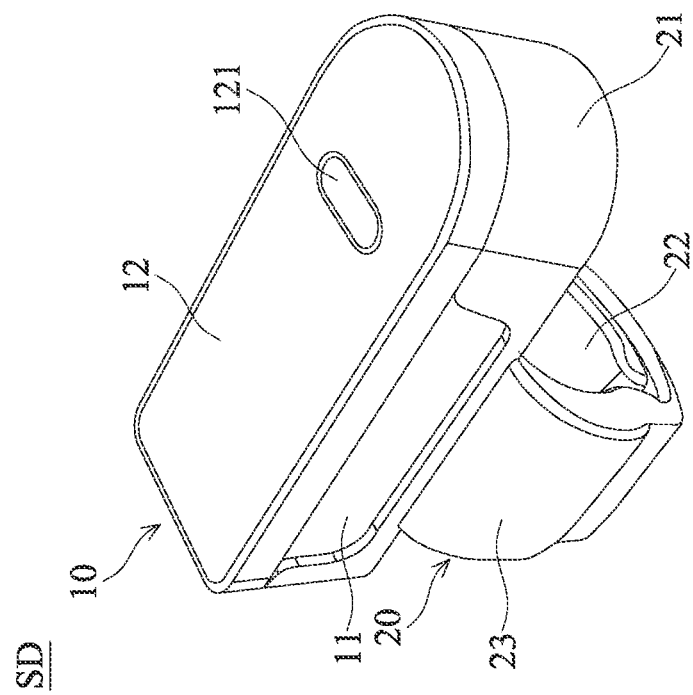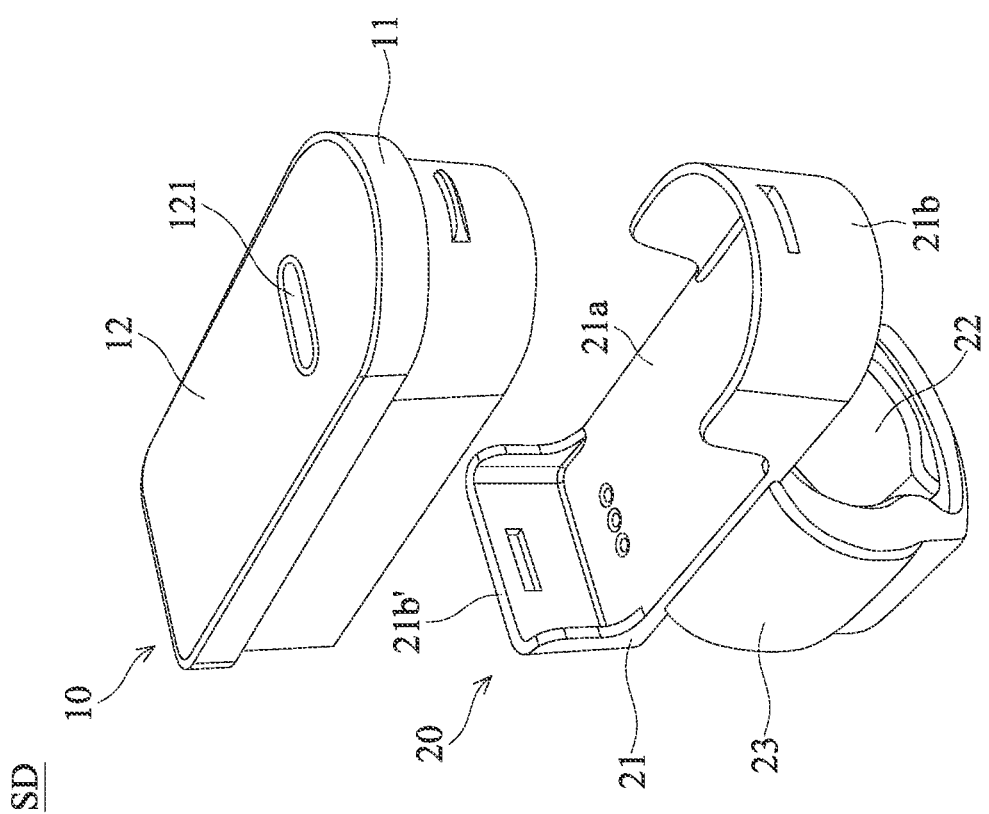
FIG. 1A
FIG. 1B

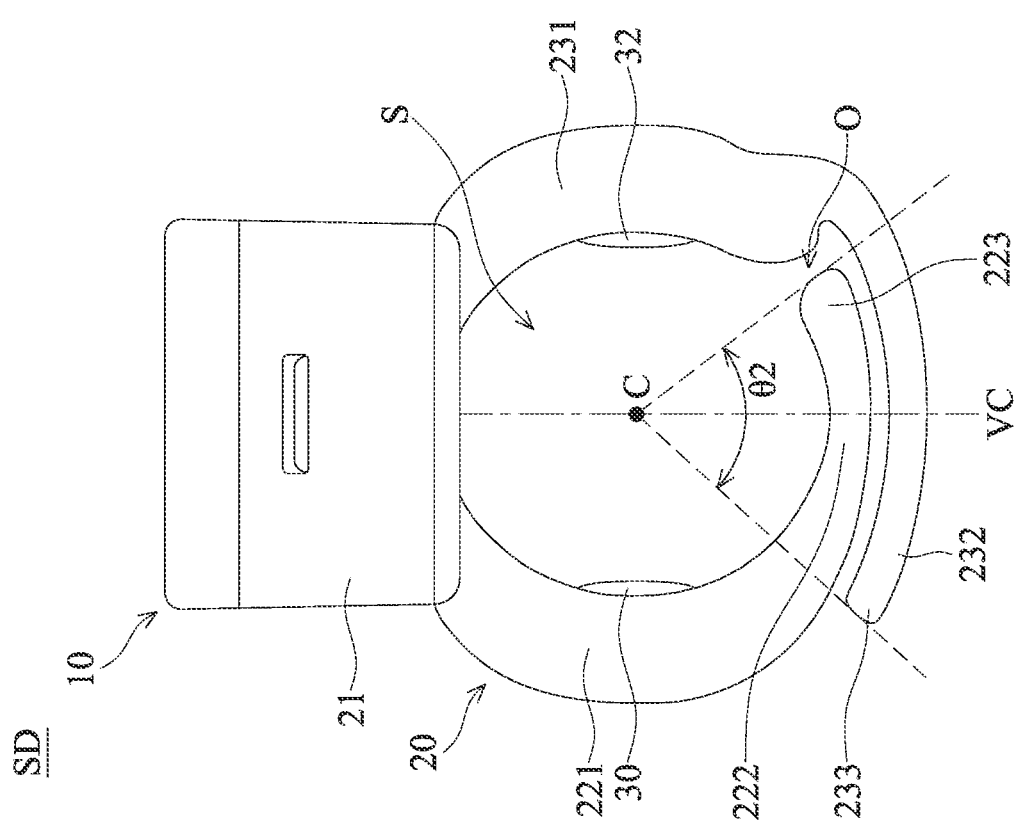
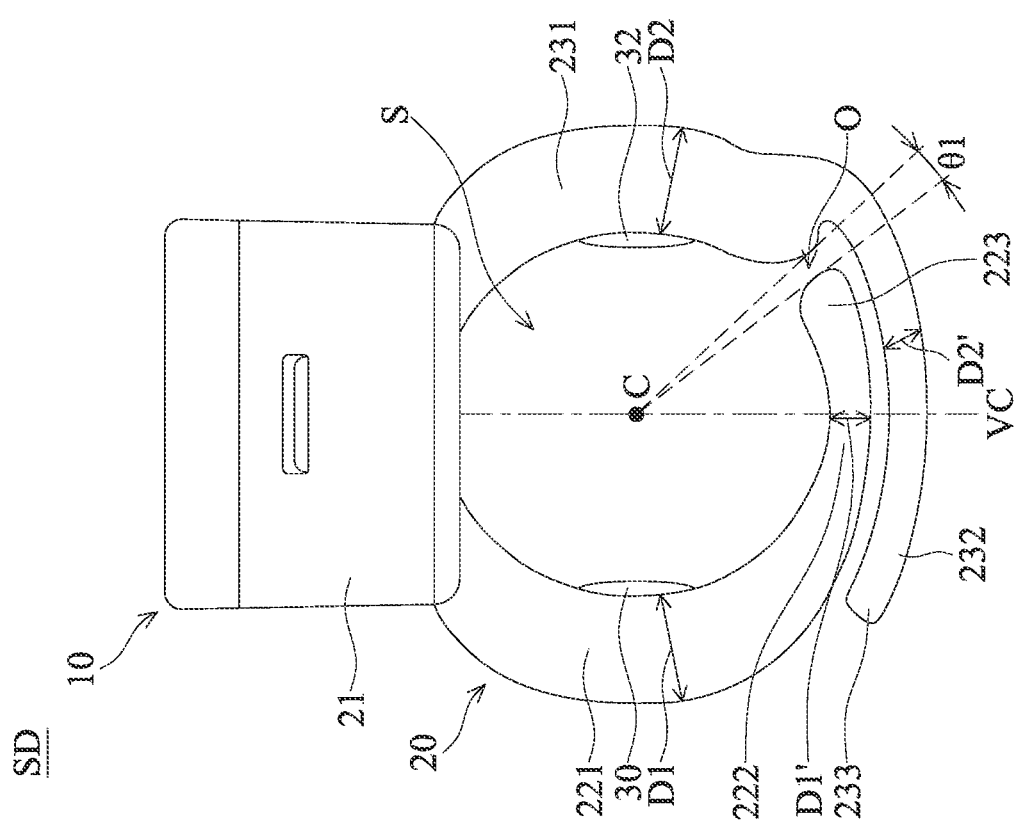

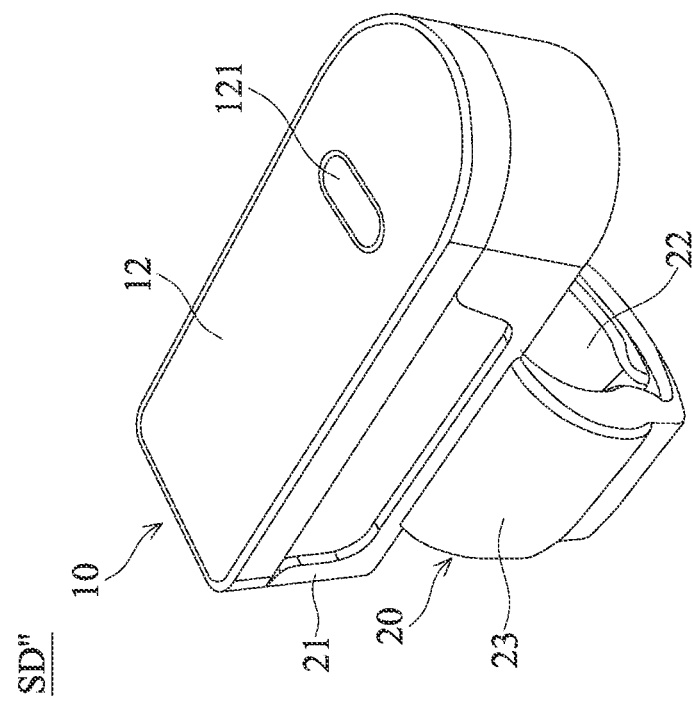
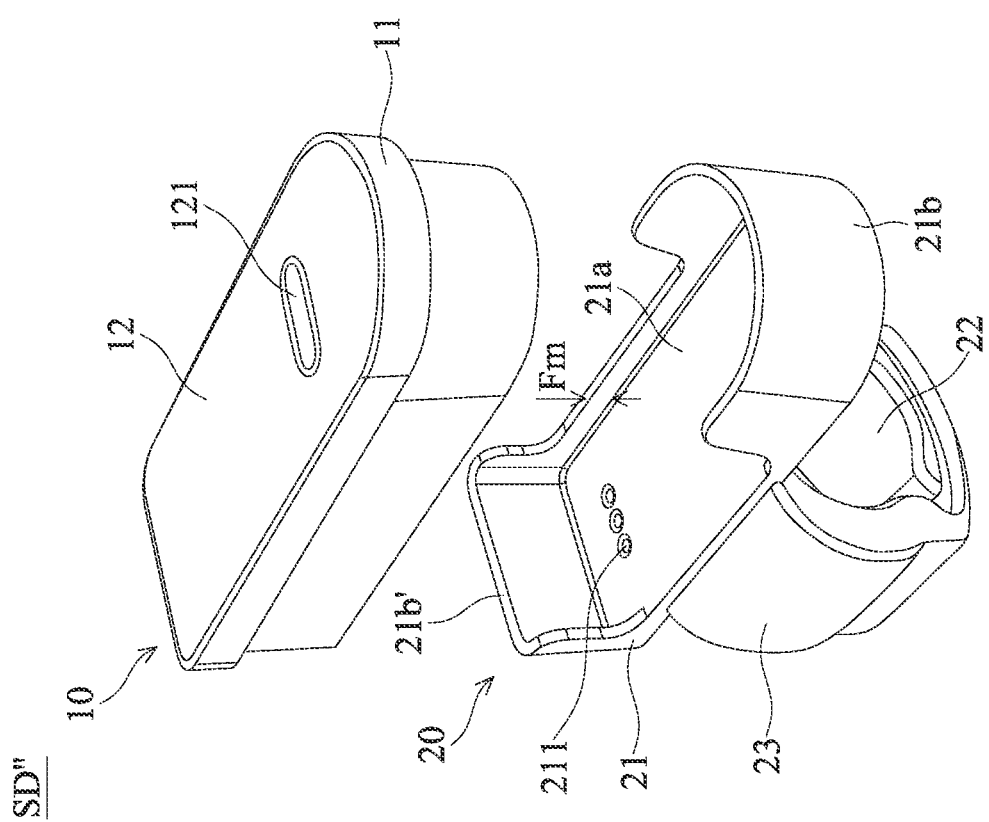
FIG. 7A
FIG. 7B

FINGER-WORN SENSING DEVICE

CROSS REFERENCE TO RELATED APPLICATIONS

This application claims priority of Taiwan Patent Application No. 111203921, filed on Apr. 18, 2022, the entirety of which is incorporated by reference herein.

BACKGROUND OF THE INVENTION

Field of the Invention

The present invention relates to a finger-worn sensing device, and, in particular, to a finger-worn sensing device that includes a semi-enclosed elastic finger-worn structure, which users can wear for a long time to monitor their blood oxygen level.

Description of the Related Art

Blood oxygen level ($SpO_2$) is the percentage of the volume of oxygenated hemoglobin ($HbO_2$) in the blood that is bound by oxygen relative to the total amount of hemoglobin (Hb) in the blood. It can provide medical staff with a life-monitoring judgment, and allow them to carry out accurate oxygen supply medical behavior. At present, finger-worn sensing devices are primarily used to measure blood oxygen level. When measuring, a sensing device is just put on the user's finger, and the user's blood oxygen level can be detected by the light sensor in the sensing device.

Although existing finger-worn sensing devices have generally been adequate for their intended purposes, they have not been entirely satisfactory in all respects. For example, the main problems of the current finger-worn sensing devices are how to stably fit them to fingers of different thicknesses, how to improve the comfort of users wearing them, and how to obtain a stable signal quality under conditions of long-term wearing.

BRIEF SUMMARY OF THE INVENTION

In view of the above-mentioned conventional problems, the object of the disclosure is to provide a finger-worn sensing device that can be elastically adjusted for fingers of different sizes and circumferences (i.e., it is self-adaptive) and provide a tighter fit between the finger and the light sensor through the elasticity of the elastic bands, thereby improving wearing stability and comfort and improving the accuracy of measurement.

According to the above-mentioned object of the disclosure, a finger-worn sensing device is provided, including a measurement-device body, a finger-worn structure, a light emitter and a light receiver. The finger-worn structure includes a carrying base, wherein the measurement-device body is detachably mounted on the carrying base. The finger-worn structure also includes a first elastic band and a second elastic band, which respectively extend from respective sides of the carrying base and overlap each other under the carrying base to form an annular space for the finger to pass through. The first elastic band has a first free end and the second elastic band has a second free end. The first free end is closer to the annular space than the second free end. There is an opening between the first free end and the inner wall of the second elastic band. The light emitter and the light receiver are respectively located on the inner wall of the first elastic band and the inner wall of the second elastic band, and are oppositely arranged, so that they can optically sense physiological readings from the finger.

In an embodiment, the first elastic band includes a first support portion, a first extension portion and the first free end. One end of the first support portion is connected to the carrying base. The first extension portion extends from the other end of the first support portion. The first free end is the end of the first extension portion that is farthest away from the first support portion. Also, the second elastic band includes a second support portion, a second extension portion and the second free end. One end of the second support portion is connected to the carrying base. The second extension portion extends from the other end of the second support portion. The second free end is the end of the second extension portion that is farthest away from the second support portion. The first support portion and the second support portion are located on the respective sides of the carrying base, and the first extension portion and the second extension portion overlap each other directly below the carrying base to form the annular space.

In an embodiment, the annular space extends in an axial direction. When viewed from the axial direction, an included angle of at least 70 degrees is formed between the overlapping area of the first extension portion and the second extension portion and the center of the annular space, and an included angle of 4 to 6 degrees is formed between the opening between the first free end and the inner wall of the second elastic band and the center of the annular space.

In an embodiment, the thickness of the first support portion is greater than the thickness of the first extension portion, and the thickness of the second support portion is greater than the thickness of the second extension portion. The light emitter and the light receiver are respectively disposed in the inner wall of the first support portion and the inner wall of the second support portion, and are exposed from the inner wall of the first support portion and the inner wall of the second support portion.

In an embodiment, the carrying base, the first elastic band and the second elastic band are integrally formed.

In an embodiment, the carrying base has either a positioning hook or a positioning slot, and the measurement-device body has the other. Therefore, the measurement-device body and the carrying base may be combined through the positioning hook and corresponding positioning slot.

In an embodiment, the carrying base has either a positioning hook or a positioning slot, and it also has either a slide rail or a slider, whereas the measurement-device body has the other of the positioning hook or positioning slot, as well as the other of the slide rail or slider. Therefore the measurement-device body and the carrying base may be combined through the positioning hook and corresponding slot, and the slide rail and corresponding slider.

In an embodiment, the carrying base has either a magnet or a metal sheet, and the measurement-device body has the other of the magnet or the metal sheet. The measurement-device body can therefore adhere to the carrying base via the metal sheet and corresponding magnet.

In an embodiment, a first electrical connector is provided on the surface of the measurement-device body facing the carrying base, a second electrical connector is provided on the surface of the carrying base facing the measurement-device body, and the first electrical connector and the second electrical connector are electrically coupled to each other. Moreover, a first flexible circuit board and a second flexible circuit board are respectively disposed in the first elastic band and the second elastic band for electrically coupling the light emitter to the second electrical connector and electrically coupling the light receiver to the second electrical connector, so that the light emitter and the light receiver are electrically coupled to the measurement-device body.

In an embodiment, the measurement-device body includes a microprocessor, a display, a rechargeable battery and a vibrator. The microprocessor is configured to process the sensing results of the light emitter and the light receiver. The display is configured to display the user's measurement result. The vibrator is configured to vibrate when the measurement result is abnormal.

In order to illustrate the purposes, features and advantages of the invention, the preferred embodiments and figures of the invention are shown in detail as follows.

BRIEF DESCRIPTION OF THE DRAWINGS

The present invention can be more fully understood by reading the subsequent detailed description and examples with references made to the accompanying drawings, wherein:

FIG. 1A is a schematic perspective view of a finger-worn sensing device in accordance with an embodiment of the disclosure when it is disassembled;

FIG. 1B is a schematic perspective view showing the finger-worn sensing device of FIG. 1A after assembly;

FIG. 5A is a schematic view showing the angle design of the opening between the free end of the first elastic band the second elastic band in FIG. 2;

FIG. 5B is a schematic view showing the angle design of the overlapping area of the first elastic band and the second elastic band in FIG. 2;

FIG. 7A is a schematic perspective view of a finger-worn sensing device in accordance with another embodiment of the disclosure when it is disassembled; and FIG. 7B is a schematic perspective view showing the finger-worn sensing device of FIG. 7A after assembly.

DETAILED DESCRIPTION OF THE INVENTION

Figure 2:
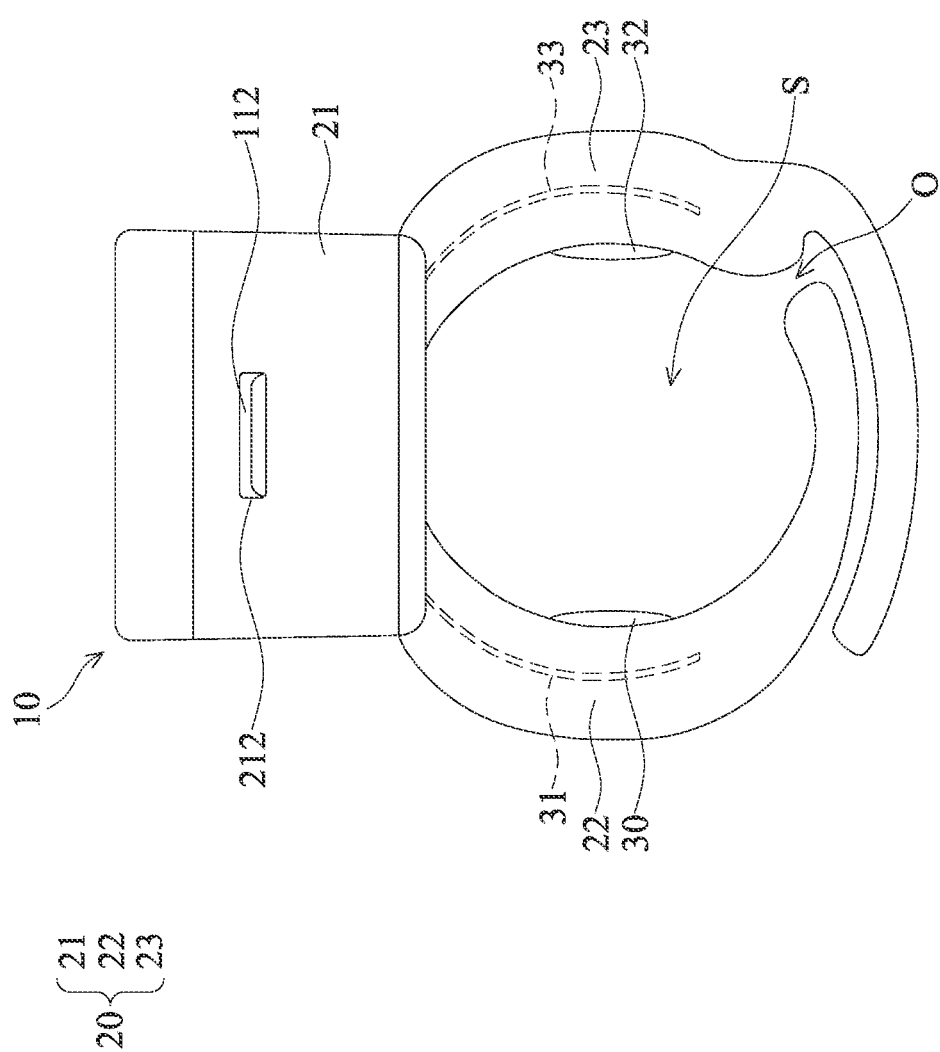
FIG. 2 is a side view showing the finger-worn sensing device of FIG. 1B.

The following description is made for the purpose of illustrating the general principles of the finger-worn sensing device of the disclosure and should not be taken in a limiting sense. The scope of the invention is best determined by reference to the appended claims.

In the following detailed description, the orientations of "on", "above", "under", "below", "left", "right" or similar spatially related terms are used for representing the relationship between the relative positions of each element as illustrated in the drawings, and are not meant to limit the invention. Moreover, the terms "first", "second" etc. may be used in the following detailed description to describe various elements, components or sections, but these elements, components or sections should not be limited by these terms. These terms are only used to distinguish one element, component or section from another element, component or section. Thus, a first element, component or section discussed below could also be termed a second element, component or section without departing from the teachings of the present invention. When it is mentioned that a first element is located on a second element, it may include situations where the first element is in direct contact with the second element or is spaced from the second element by one or more other elements.

In addition, the present disclosure may repeat reference numerals and/or letters in the various examples. This repetition is for the purpose of simplicity and clarity and does not in itself dictate a relationship between the various embodiments and/or configurations discussed. Various features may be arbitrarily drawn in different scales for the sake of simplicity and clarity. Furthermore, elements not shown or described in the embodiments are in the form known to those of ordinary skill in the art.

Figure 3:
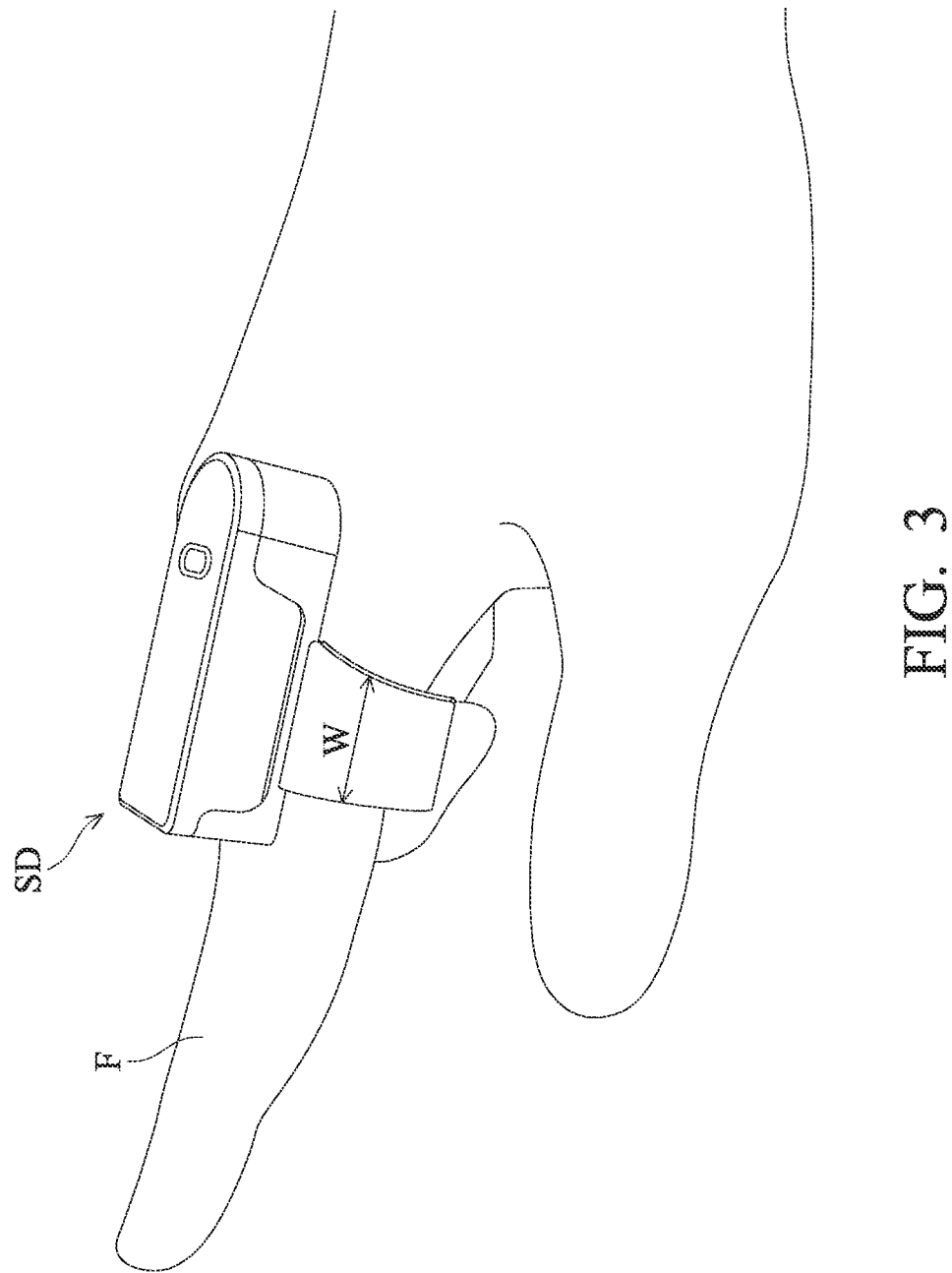
FIG. 3 is a schematic view showing that the finger-worn sensing device is worn on the user's finger to measure blood oxygen level.

FIG. 1A is a schematic perspective view of a finger-worn sensing device SD in accordance with an embodiment of the disclosure when it is disassembled. FIG. 1B is a schematic perspective view showing the finger-worn sensing device SD of FIG. 1A after assembly. FIG. 2 is a side view showing the finger-worn sensing device SD of FIG. 1B. FIG. 3 is a schematic view showing that the finger-worn sensing device SD is worn on the user's finger F to measure blood oxygen level.

Referring to FIGS. 1A, 1B, 2 and 3, the finger-worn sensing device SD according to an embodiment of the disclosure mainly includes a measurement-device body 10, an elastic finger-worn structure 20 (hereinafter referred as the finger-worn structure 20), a light emitter 30 and a light receiver 32. The measurement-device body 10 is detachably mounted on the carrying base 21 of the finger-worn structure 20. When measuring, the finger-worn structure 20 is worn on (wrapped around) the root of one finger F of the user through its two elastic bands 22 and 23. The light emitter 30 and the light receiver 32 are respectively located on (e.g., embedded in) the inner walls of the two elastic bands 22 and 23 of the finger-worn structure 20, and are in close contact with the finger F, so that they can optically sense physiological readings (such as blood oxygen level) from the finger F, and then transmit the sensing results (such as electrical signals) to the measurement-device body 10 for processing and result display. Each of the above-mentioned device components will be further described below.

As shown in FIGS. 1A and 1B, the measurement-device body 10 includes a housing 11 and a display 12 located on the top of the housing 11. The display 12 may be an LCD (liquid crystal display) or LED (light emitting diode) display. Although not shown separately, a microcontroller/microprocessor, a vibrator, a wireless transmission module, a power module, etc. may be provided inside the housing 11 of the measurement-device body 10.

The microcontroller is configured to provide a control signal to the light emitter 30 and the light receiver 32 (they are also collectively referred to as a "light sensor") to operate the light sensor to sense the blood oxygen level of the blood in the finger F. The microprocessor is configured to process the sensing results (such as electrical signals) from the light sensor, for example, to calculate the blood oxygen level values according to the preset sampling frequency, and then display these values on the display 12. In various embodiments, the microcontroller and the microprocessor are separate elements or integrated together. In this embodiment, the display 12 can also be a touch display with e touch/invisible buttons 121, so as to facilitate the user's measurement operation. For example, when the user touches the touch button 121, the microcontroller/microprocessor can control the light sensor to measure or stop the measurement. The vibrator is electrically coupled to the microcontroller/microprocessor, and is configured to vibrate to alert the user when the measurement result is abnormal (e.g., when the measured blood oxygen level value is lower than the preset value). The wireless transmission module such as Bluetooth, Wifi or other wireless communication protocols is configured for wireless communication with an external device (such as a mobile phone, computer or other wearable electronic device, etc.), so that measurement information can be exchanged between devices. Accordingly, it is beneficial to further operations such as information feedback, remote control and monitoring. The power module such as a rechargeable battery (such as a rechargeable lithium battery), or a charging module (such as an inductive charging circuit), which can be charged via electrical connectors such as pogo pins.

Figure 4:
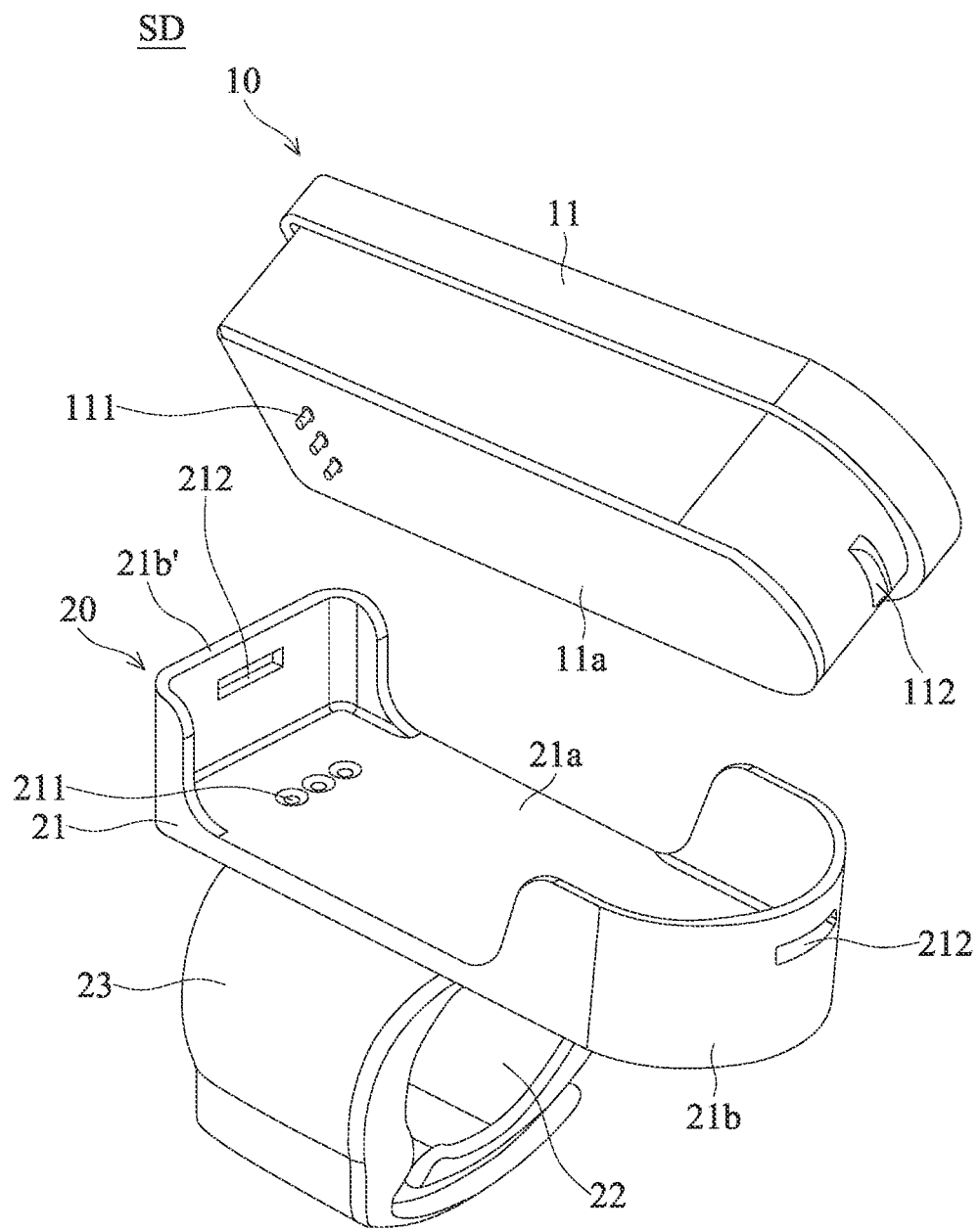
FIG. 4 is a schematic view showing the configuration of the electrical connectors between the measurement-device body and the finger-worn structure in FIG. 1A.

For example, in this embodiment (as shown in FIG. 4), at least one (first) electrical connector 111 (such as pogo pins) is provided on or protrudes from the bottom surface 11a of the housing 11. When charging is required, simply remove the measurement-device body 10 from the finger-worn structure 20 and attach the charging cable (not shown) to the electrical connector 111, and then the power module of the measurement-device body 10 can be charged.

In addition, when the measurement-device body 10 is installed on the carrying base 21 of the finger-worn structure 20, the (first) electrical connector 111 located on the bottom surface 11a of the measurement-device body 10 can be electrically coupled to at least one (second) electrical connector 211 (such as a conductive contact) provided on or exposed from the upper surface 21a of the carrying base 21. Therefore, the measurement-device body 10 can be signal-connected in series with the light emitter 30 and the light receiver 32 located in the finger-worn structure 20 (which will be described in more detail later).

It should be noted that the internal configurations of the measurement-device body 10 described herein are only illustrative, and are not intended to be, and should not be constructed to be, limiting to the embodiments of the present disclosure. Additional components or features can be added to the measurement-device body 10, and/or some of the features described above can be replaced or altered in other embodiments.

The finger-worn structure 20 includes an elastic carrying base 21, a (first) elastic band 22 and a (second) elastic band 23. The carrying base 21 is configured to receive and secure the measurement-device body 10. For example, the carrying base 21 may include an upper surface 21a substantially matching the shape of the measurement-device body 10, and a pair of sidewalls 21b, 21b' extending vertically upward from both sides of the upper surface 21a, so as to form an accommodating space between the upper surface 21a and the two sidewalls 21b, 21b' for receiving and surrounding the measurement-device body 10.

Moreover, the measurement-device body 10 is detachably mounted on the carrying base 21. For example, in this embodiment (as shown in FIG. 4), two positioning slots 212 are respectively formed on the two sidewalls 21b, 21b' of the carrying base 21, and two positioning hook 112 corresponding to the two positioning slots 212 are formed on the housing 11 sidewalls of the measurement-device body 10. Through the combination of (e.g., be engaging) the positioning slots 212 and corresponding positioning hooks 112, the measurement-device body 10 and the carrying base 21 can be combined. Conversely, the measurement-device body 10 can be separated from the carrying base 21. In some other embodiments, the positioning slots can be changed to be formed on the housing 11 sidewalls of the measurement-device body 10, and the positioning hooks can be changed to be formed on the sidewalls 21b, 21b' of the carrying base 21.

The first elastic band 22 and the second elastic band 23 of the finger-worn structure 20 extend from both sides of the carrying base 21 respectively, and overlap each other under the carrying base 21 to form an annular space S for the finger F to pass through. Particularly, the first elastic band 22 and the second elastic band 23 are configured to form a "semi-enclosed" annular space S (different from conventional finger-worn sensing devices, which may have an "enclosed" annular structure for fixing fingers or two "open" C-shaped structures with additional positioning structures to achieve a combined design). This facilitates elastic adaptation of fingers F of different sizes/finger circumferences, improves the wearing stability and comfort, and improves the accuracy of measurement (which will be described further below).

As shown in FIGS. 2 and 3, the light emitter 30 and the light receiver 32 are respectively located on the inner wall of the first elastic band 22 and the inner wall of the second elastic band 23, and are oppositely arranged. When measuring, the light emitter 30 is used to emit light into the finger F, and the light receiver 32 is used to receive the light that penetrates the blood in the blood vessels in the finger F or is reflected by the blood, and then converts the received light signal into an electrical signal. Accordingly, the user's blood oxygen level can be sensed optically. Since the use of the above-mentioned light sensor to sense blood oxygen level is common known technology in the field, the types or other features of the light sensor (i.e., the light emitter 30 and the light receiver 32) will not be described here.

Moreover, a first printed circuit board (FPC) 31 and a second flexible printed circuit board 33 are respectively provided (e.g., embedded) in the first elastic band 22 and the second elastic band 23 for electrically coupling the light emitter 30 and the light receiver 32 with the second electrical connector 211 (see FIG. 4) provided in the carrying base 21. Therefore, through the first electrical connector 111, the second electrical connector 211, the first printed circuit board 31 and the second flexible printed circuit board 33, the light emitter 30 and the light receiver 32 can be coupled to the measurement-device body 10 in a signal serial connection.

In this embodiment, the carrying base 21, the first elastic band 22 and the second elastic band 23 of the finger-worn structure 20 are made of elastic materials such as rubber or thermoplastic elastomer (TPE), and are integrally formed (for example, formed by injection molding or a similar process). In addition, the light emitter 30, the light receiver 32, the first printed circuit board 31, the second flexible printed circuit board 33, etc. can be positioned in the mold prior to the molding process. Accordingly, they are embedded in the finger-worn structure 20 after the molding process is completed.

Next, the structural design of the first elastic band 22 and the second elastic band 23 of the finger-worn structure 20 is further described with reference to FIGS. 2, 5A and 5B. As described above, the first elastic band 22 and the second elastic band 23 are configured to form a "semi-enclosed" annular space S. It should be understood that the term "semi-enclosed" as used herein means that both the first elastic band 22 and the second elastic band 23 have free ends and are not interconnected or combined in any other way to form an "enclosed" finger-receiving space.

As shown in FIGS. 2, 5A and 5B, the first elastic band 22 is basically composed of a first support portion 221 and a first extension portion 222. One end of the first support portion 221 is connected to (such as extended from) the carrying base 21. The first extension portion 222 extends from the other end of the first support portion 221. The end of the first extension portion 222 that is farthest away from the first support portion 221 is a free end 223 (hereinafter referred to as the first free end 223). Similarly, the second elastic band 23 is basically composed of a second support portion 231 and a second extension portion 232. One end of the second support portion 231 is connected to (such as extended from) the carrying base 21. The second extension portion 232 extends from the other end of the second support portion 231. The end of the second extension portion 232 that is farthest away from the second support portion 231 is a free end 233 (hereinafter referred to as the second free end 233). In this embodiment, the first support portion 221 and the second support portion 231 are respectively located on two sides of the carrying base 21, and the first extension portion 222 and the second extension portion 232 overlap each other directly below the carrying base 21. The first support portion 221, the second support portion 231, the first extension portion 222 and the second extension portion 232 are all designed in an arc shape that conforms to the contour (shape) of the finger F.

More specifically, the first extension portion 222 extends from the first support portion 221 toward the second elastic band 23 and exceeds a vertical centerline VC passing through the center C of the annular space S, and the second extension portion 232 extends from the second support portion 231 toward the first elastic band 22 and exceeds the vertical centerline VC passing through the center C of the annular space S. The first extension portion 222 and the second extension portion 232 are arranged in a manner of overlapping inside and outside. For example, the first extension portion 222 may be closer to the annular space S than the second extension portion 232 (i.e., the first extension portion 222 is located in the inner circle, and the second extension portion 232 is located in the outer circle), so the first free end 223 is also closer to the annular space S than the second free end 233. Particularly, the first free end 223 and the second elastic band 23 are not connected (for example, there is an opening O between the first free end 223 and the inner wall of the second elastic band 23), and the second free end 233 and (the outer wall of) the first elastic band 22 are not connected.

Therefore, a "semi-enclosed" annular space S (rather than an "enclosed" finger-receiving space) is formed between the first support portion 221, the first extension portion 222 and the second support portion 231 for the finger F to pass through, and the annular space S has a substantially circular cross-sectional contour that conforms to the contour (shape) of the finger F. In addition, as shown in FIG. 3, the first elastic band 22 and the second elastic band 23 each have a certain width W (in order to improve the wearing stability of the finger-worn sensing device SD), so the annular space S also extends in an axial direction (i.e., the width direction of the first elastic band 22 and the second elastic band 23 or the extension direction of the finger F). The light emitter 30 and the light receiver 32 are respectively disposed in the inner wall of the first support portion 221 and the inner wall of the second support portion 231, and are exposed from the inner wall of the first support portion 221 and the inner wall of the second support portion 231.

In this embodiment (as shown in FIG. 5), the thickness D1 of the first support portion 221 is greater than the thickness D1' of the first extension portion 222, and the thickness D2 of the second support portion 231 is greater than the thickness D2' of the second extension portion 232. The thickness of the support portion 221/the support portion 231 is relatively large, which is beneficial to the accommodation of the light emitter 30 and the light receiver 32. The thickness of the extension portion 222/extension portion 232 is thinner, which makes them easier to stretch and bend (good elasticity) to adapt to fingers F of different sizes/finger circumferences.

In this embodiment, when viewed from the axial direction of the annular space S (as shown in FIG. 5A), an included angle θ1 of 4 to 6 degrees is formed between the opening O between the first free end 223 of the first extension portion 222 (inner circle) and the inner wall of the second elastic band 23 and the center C of the annular space S. This opening O angle/gap allows the finger F to easily pass through the annular space S, and has good wrapping. However, in some cases, openings O with different angles/gap may also be used.

In this embodiment, when viewed from the axial direction of the annular space S (as shown in FIG. 5B), an included angle θ2 of 70 to 90 degrees is formed between the overlapping area (one end is the first free end 223 of the first extension portion 222, and the other end is the second free end 233 of the second extension portion 232) of the first extension portion 222 (inner circle) and the second extension portion 232 (outer circle) and the center C of the annular space S. This overlapping angular range/area is suitable for most sizes of fingers F, and provides better stability and light-shading properties (for example, preventing light leakage from the light sensor) for users wearing the finger-worn sensing device SD. However, in some cases, different overlapping angular ranges or areas may also be used.

Through the above design, the "semi-enclosed" annular structure design of the elastic finger-worn structure 20 can be adapted to most fingers with different finger circumferences for elastic/soft stretch adjustment (i.e., it is self-adaptive), and provides a tighter fit between the finger and the elastic bands (and the light sensor disposed therein) through the elasticity of the elastic material (such as rubber or TPE). Therefore, the user's (long-term) wearing stability and comfort can be improved, and the accuracy of measurement can be improved.

Many variations and/or modifications can be made to the finger-worn sensing device embodiments of the disclosure. For example, a mechanism other than the positioning hook-slot can also be used between the measurement-device body 10 and the finger-worn structure 20 to achieve a detachable combination, which will be further described below with reference to FIGS. 6A, 6B, 7A and 7B.

Figure 6A:
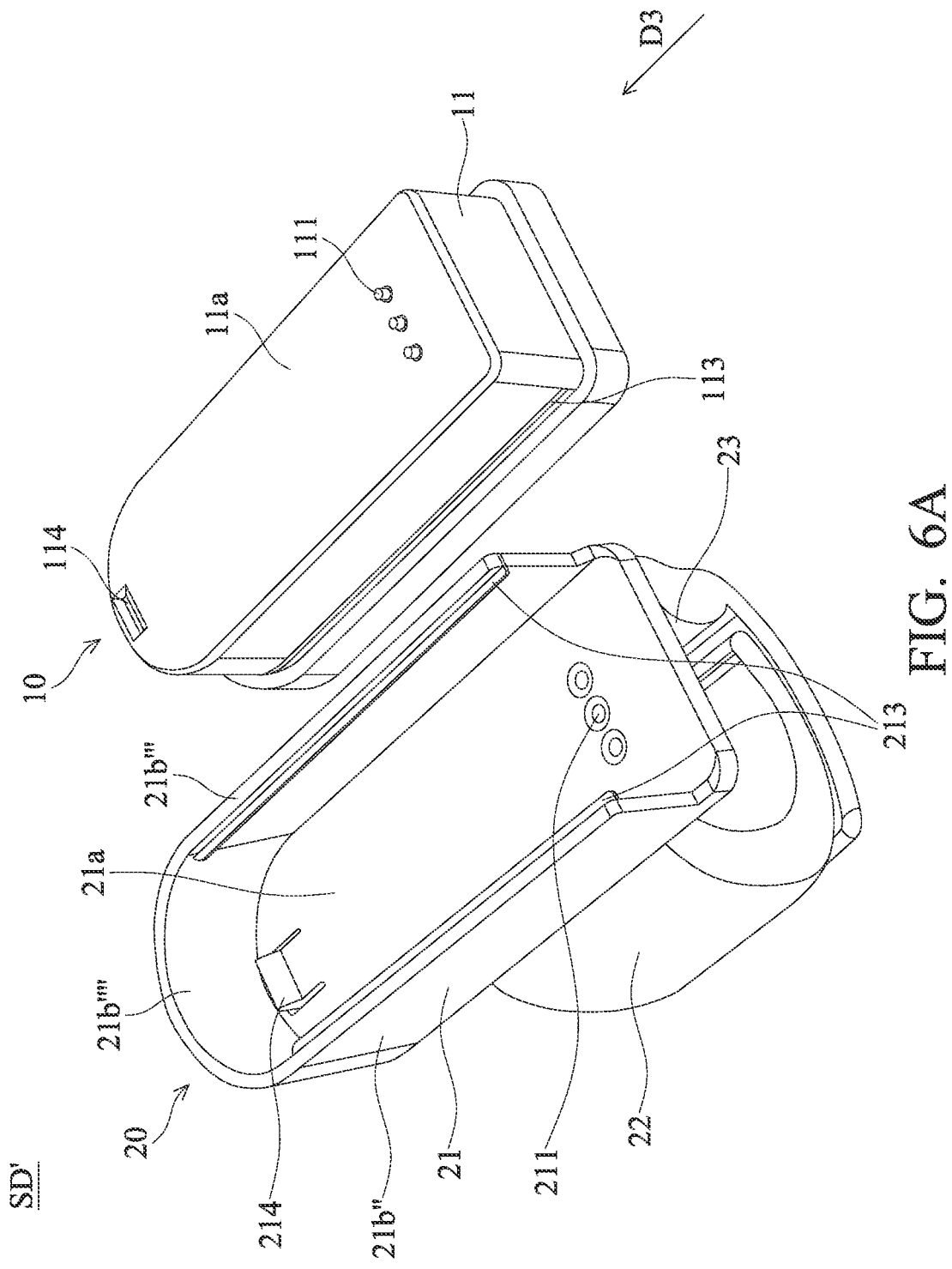
FIG. 6A is a schematic perspective view of a finger-worn sensing device in accordance with another embodiment of the disclosure when it is disassembled.
Figure 6B:
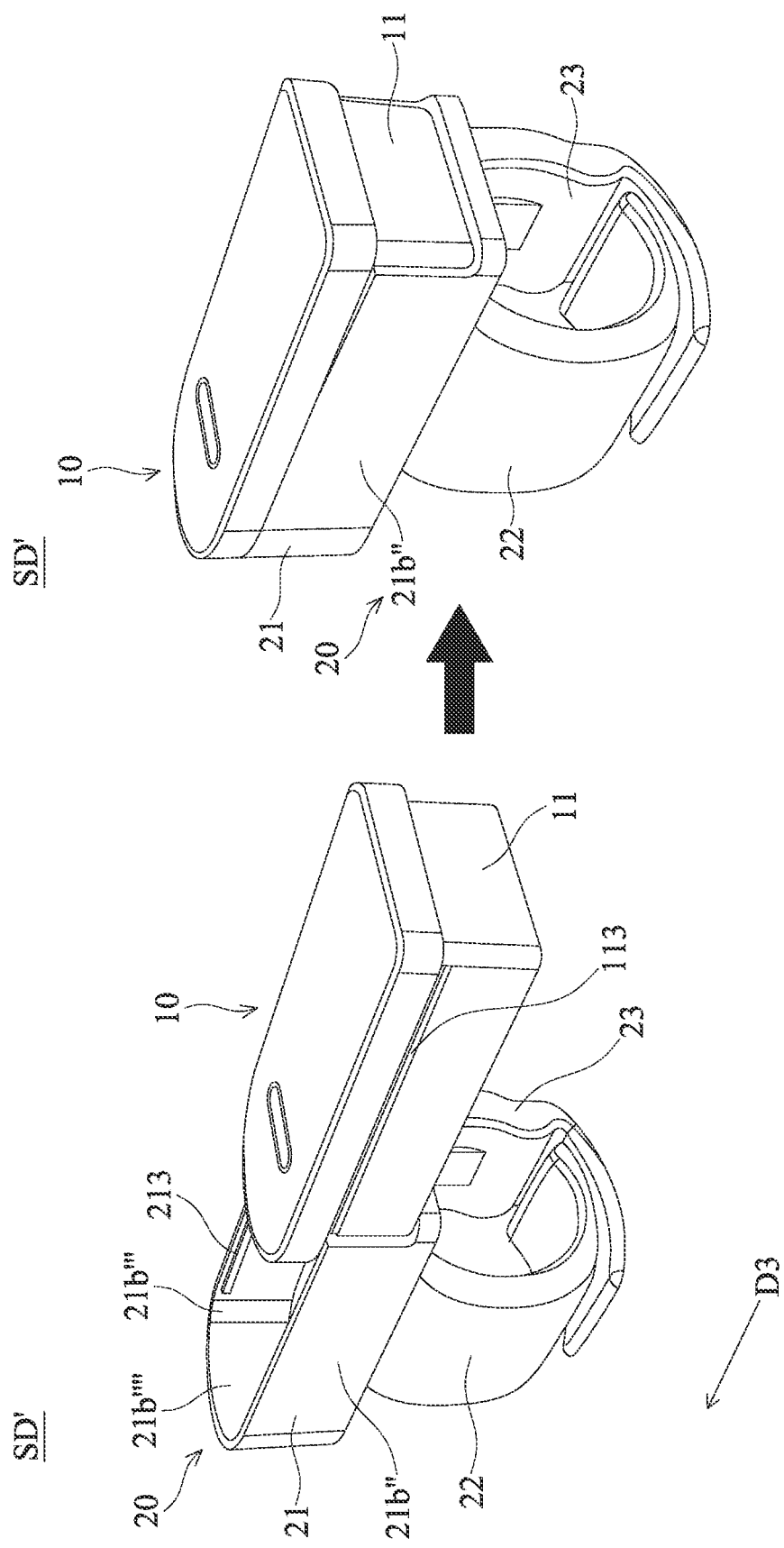
FIG. 6B is a schematic view showing the assembly method of the finger-worn sensing device of FIG. 6A.

Referring to FIGS. 6A and 6B, in a finger-worn sensing device SD' according to another embodiment of the disclosure, a pair of elongated (extending in a linear direction D3), recessed slide rails 113 are formed on both sidewalls of the measurement-device body 10, and a positioning slot 114 is formed on the bottom surface 11a of the measurement-device body 10. Correspondingly, a pair of elongated (extending in the linear direction D3), protruding sliders 213 are formed on both sidewalls 21b'', 21b''' of the carrying base 21 of the finger-worn structure 20, and a positioning hook 214 is formed on the upper surface 21a of the carrying base 21. During assembly, the slide rails 113 of the measurement-device body 10 can be aligned with the sliders 213 of the carrying base 21 first, and then, along the extending direction (i.e., the linear direction D3) of the slide rails 113 and the sliders 213, the measurement-device body 10 is pushed into the accommodating space of the carrying base 21 until the positioning slot 114 of the measurement-device body 10 and the positioning hook 214 of the carrying base 21 are combined (e.g., engaged). Consequently, the assembly of the measurement-device body 10 and the finger-worn structure 20 (carrying base 21) is completed. As shown in FIGS. 6A and 6B, another protruding sidewall 21b"" is further provided between the two sidewalls 21b", 21b'" of the carrying base 21 and near the positioning hook 214, which is configured to restrict the measurement-device body 10 from continuing to move forward (i.e., for limiting) after the measurement-device body 10 has completely entered into the accommodating space of the carrying base 21.

In this embodiment, if the measurement-device body 10 needs to be separated from the finger-worn structure 20 (for example, when the measurement-device body 10 needs to be charged), the above operations can be performed in reverse. In some other embodiments, the sliders and/or positioning hook can be changed to be formed on the housing 11 sidewalls and the bottom surface 11a of the measurement-device body 10, and the slide rails and/or positioning slot can be changed to be formed on the sidewalls 21b", 21b'" and the upper surface 21a of the carrying base 21.

Next, referring to FIGS. 7A and 7B, in a finger-worn sensing device SD" according to another embodiment of the disclosure, the positioning slots 212 on the sidewalls 21b, 21b' of the carrying base 21 and the positioning hooks 112 on the housing 11 sidewalls of the measurement-device body 10 as shown in FIG. 4 are omitted. Instead, a magnet and a corresponding metal sheet (such as an iron sheet, etc.) are arranged between the carrying base 21 and the measurement-device body 10 (for simplicity, the magnet and the metal sheet are not shown separately in the figures). Therefore, the measurement-device body 10 can be absorbed on the carrying base 21 by the magnetic attraction force Fm between the magnet and the metal sheet. The magnet and the metal sheet may be disposed under the measurement-device body 10 and buried under the upper surface 21a of the carrying base 21, respectively, or arranged at any optional position on the measurement-device body 10 and the carrying base 21.

In summary, the finger-worn sensing device embodiments of the disclosure have the following advantages: the measurement-device body and the finger-worn structure are detachable, so they can be easily disassembled (for example, when the measurement-device body needs to be charged), and it is easier to clean dead corners. Moreover, the "semi-enclosed" annular structure design of the elastic finger-worn structure can adapt to the elastic expansion adjustment of fingers with different sizes/finger circumferences (i.e., it is self-adaptive), and provides a tighter fit between the finger and the elastic bands (and the light sensor disposed therein) through the elasticity of the elastic material (such as rubber or TPE). Therefore, the user's (long-term) wearing stability and comfort can be improved, and the accuracy of measurement can be improved.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A finger-worn sensing device, comprising:
   a measurement-device body;
   a finger-worn structure, comprising:
      a carrying base, wherein the measurement-device body is detachably mounted on the carrying base; and
      a first elastic band and a second elastic band, wherein the first elastic band and the second elastic band extend from respective sides of the carrying base, and overlap each other under the carrying base to form an annular space for a finger to pass through, wherein the first elastic band has a first free end and the second elastic band has a second free end, wherein the first free end is closer to the annular space than the second free end, and there is an opening between the first free end and an inner wall of the second elastic band; and
   a light emitter and a light receiver, wherein the light emitter and the light receiver are respectively located on an inner wall of the first elastic band and the inner wall of the second elastic band, and are oppositely arranged, so that they can optically sense physiological readings from the finger.

2. The finger-worn sensing device as claimed in claim 1, wherein:
   the first elastic band comprises a first support portion, a first extension portion and the first free end, wherein one end of the first support portion is connected to the carrying base, the first extension portion extends from the other end of the first support portion, and the first free end is the end of the first extension portion that is farthest away from the first support portion;
   the second elastic band comprises a second support portion, a second extension portion and the second free end, wherein one end of the second support portion is connected to the carrying base, the second extension portion extends from the other end of the second support portion, and the second free end is the end of the second extension portion that is farthest away from the second support portion; and
   the first support portion and the second support portion are located on the respective sides of the carrying base, and the first extension portion and the second extension portion overlap each other directly below the carrying base to form the annular space.

3. The finger-worn sensing device as claimed in claim 2, wherein the annular space extends in an axial direction, and when viewed from the axial direction, an included angle of at least 70 degrees is formed between an overlapping area of the first extension portion and the second extension portion and a center of the annular space, and an included angle of 4 degrees to 6 degrees is formed between the opening between the first free end and the inner wall of the second elastic band and the center of the annular space.

4. The finger-worn sensing device as claimed in claim 2, wherein:
   a thickness of the first support portion is greater than a thickness of the first extension portion, and a thickness of the second support portion is greater than a thickness of the second extension portion; and
   the light emitter and the light receiver are respectively disposed in the inner wall of the first support portion and the inner wall of the second support portion, and are exposed from the inner wall of the first support portion and the inner wall of the second support portion.

5. The finger-worn sensing device as claimed in claim 1, wherein the carrying base, the first elastic band and the second elastic band are integrally formed.

6. The finger-worn sensing device as claimed in claim 1, wherein the carrying base has either a positioning hook or a positioning slot, and the measurement-device body has the other of the positioning hook or positioning slot, so that the measurement-device body and the carrying base are configured to be combined through the positioning hook and corresponding positioning slot.

7. The finger-worn sensing device as claimed in claim 1, wherein the carrying base has either a positioning hook or a positioning slot and either a slide rail or a slider, and the measurement-device body has the other of the positioning hook or the positioning slot and the other of the slide rail or the slider, so that the measurement-device body and the carrying base are configured to be combined through the positioning hook and corresponding positioning slot and the slide rail and corresponding slider.

8. The finger-worn sensing device as claimed in claim 1, wherein the carrying base has either a magnet or a metal sheet, and the measurement-device body has the other of the magnet or metal sheet, so that the measurement-device body and the carrying base are configured to be combined through the magnet and corresponding metal sheet.

9. The finger-worn sensing device as claimed in claim 1, wherein:
   a first electrical connector is provided on a surface of the measurement-device body facing the carrying base, a second electrical connector is provided on a surface of the carrying base facing the measurement-device body, and the first electrical connector and the second electrical connector are configured to be electrically coupled to each other; and
   a first flexible circuit board and a second flexible circuit board are respectively disposed in the first elastic band and the second elastic band for electrically coupling the light emitter to the second electrical connector and electrically coupling the light receiver to the second electrical connector, so that the light emitter and the light receiver are configured to be electrically coupled to the measurement-device body.

10. The finger-worn sensing device as claimed in claim 9, wherein the measurement-device body comprises:
    a microprocessor configured to process sensing results of the light emitter and the light receiver;
    a display configured to display a measurement result of a user; and
    a vibrator configured to vibrate when the measurement result is abnormal.

* * * * *